UNITED STATES PATENT OFFICE.

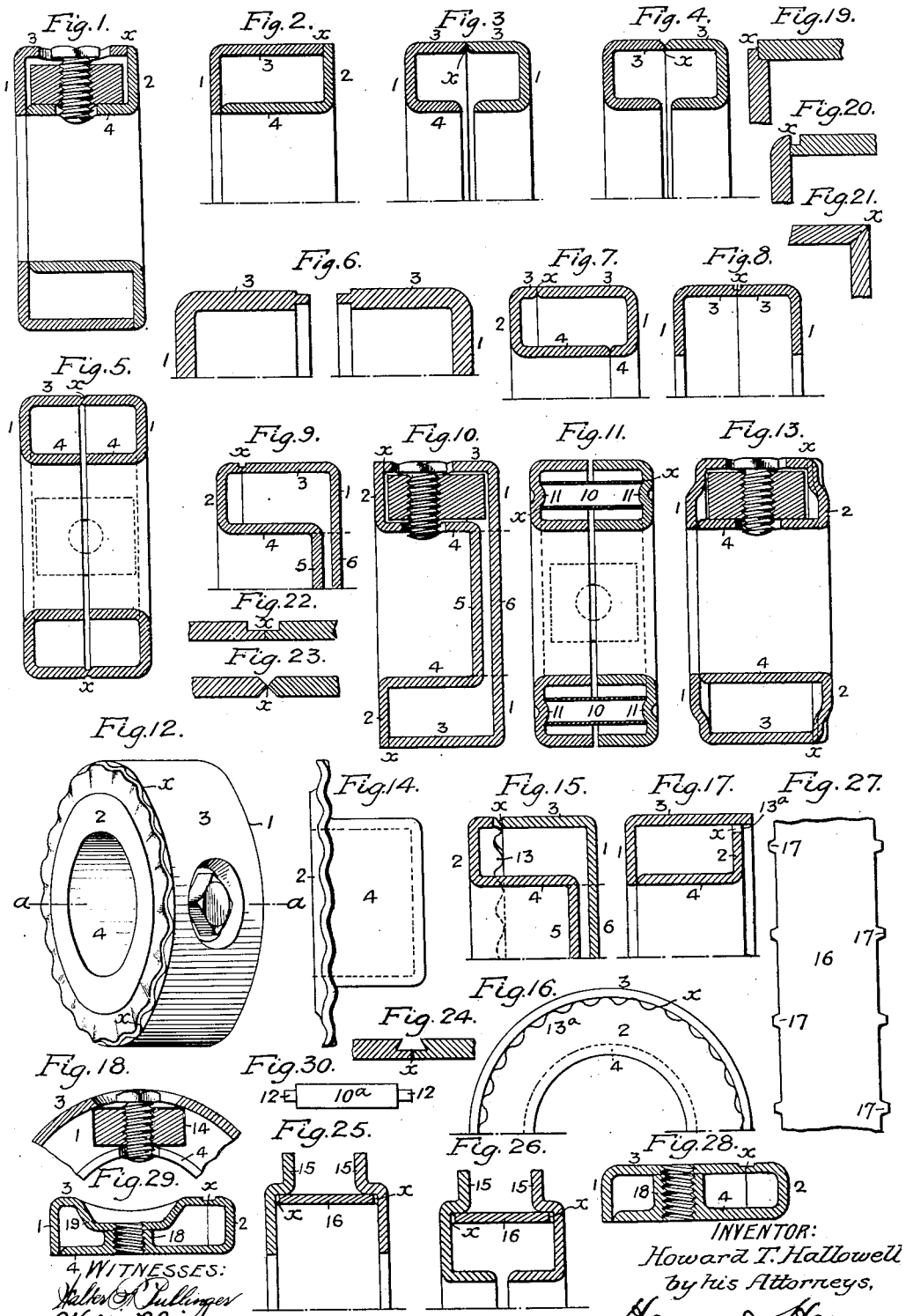

HOWARD T. HALLOWELL, OF PHILADELPHIA, PENNSYLVANIA, ASSIGNOR TO STANDARD PRESSED STEEL COMPANY, OF PHILADELPHIA, PENNSYLVANIA, A CORPORATION OF PENNSYLVANIA.

PROCESS OF MAKING SHAFT-COLLARS.

No. 926,000.     Specification of Letters Patent.     Patented June 22, 1909.

Application filed August 3, 1908. Serial No. 446,786.

*To all whom it may concern:*

Be it known that I, HOWARD T. HALLOWELL, a citizen of the United States, residing in Philadelphia, Pennsylvania, have invented an Improved Process of Making Shaft-Collars, of which the following is a specification.

My invention relates to the manufacture of sheet metal shaft collars, such as illustrated in my several patents, Nos. 894,884, 895,408 and 895,409, dated August 4, 1908, and one object of my invention is to provide improved means for securing together the sections of sheet metal previously pressed into the desired shape, which sections form a shaft collar and are so constructed as to maintain in proper position a suitable nut or other threaded support through which a set screw is passed for normally retaining such shaft collar in place upon a shaft or other similar element.

My invention consists in welding the sections forming my improved collar by a suitable agent such as an electric arc, an oxygen flame, or the flame from an oxyacetylene burner.

My invention further includes broadly the process of making an annulus or shaft collar of sections of sheet metal, wherein the sections are subsequently secured together by welding.

My invention is fully shown in the accompanying drawings, in which:

Figure 1, is a sectional view of one form of sheet metal collar welded in accordance with my invention; Figs. 2 to 11, are sectional views of other forms of collars made of sections secured together in various ways and embodying my invention; Figs. 12 to 17, are views of collars embodying my invention showing forms of point contacts employed in welding the same together; Fig. 18, shows means for insulating a nut from the sections forming a collar; Figs. 19 to 24, show other forms of contacts; Figs. 25, 26 and 27, show a form of collar comprising sections secured together by a connecting band having point contacts; Figs. 28 and 29, show a form of collar having integral set screw receiving means, and Fig. 30, is a view of a modified detail of my invention.

All of the structures forming the subject of my invention comprise two or more members of sheet metal pressed into shape to form a hollow structure, and so disposed with relation to each other as to provide mutual connection and support; in certain instances to confine in proper relative position a suitable nut for the set screw usually employed with such collars, and in certain other instances to be tapped directly for the reception of said set screw. The sections of the collar shown herewith are substantially the same as those illustrated in my patents above referred to, the only difference being the necessary provision of contact points on one or both sections whereby electric current may be applied, or the flame of an oxygen or oxyacetylene burner may be applied, when such sections are to be secured together by welding. In completing the annulus or shaft collar, the sections of the same are assembled in a suitable manner; the nut being properly positioned and maintained in such position by means of the set screw or a suitable pin which is passed through the aperture of the several sections, and then if such sections are to be secured by welding; proper insulating means being applied to the necessary parts of the collar if an electric arc is to be used, the weld is accomplished at the point or points $x$.

In Fig. 1, a pair of L-shaped sections are secured together in which the side walls 1 and 2 of the same are abutted by the edges of the peripheral walls 3 and 4.

In Fig. 2, a pair of similarly shaped sections are combined; the side wall 1 being abutted by the peripheral wall 4, while the side wall 2 abuts the peripheral wall 3.

In Fig. 3, a pair of sections substantially U-shaped in cross section are employed, in which the outer peripheral walls 3 abut and are welded together. The inner peripheral walls may or may not be spaced apart in the finished collar.

In Fig. 4, a structure similar to Fig. 3, is shown, the contact of the outer peripheral walls being adjacent the inner surface of the same; the outer corners of the edges being reduced to avoid the fin caused by welding.

Fig. 5, shows a pair of U-shaped sections joined at the meeting edges of the outer peripheral walls 3 which are reduced to avoid the fin. Fig. 6 shows an enlarged sectional view of the reduced edges before welding.

Fig. 7 shows a pair of sections substantially L-shaped in cross section; each section having a side wall 1 and 2 and an inner and outer peripheral wall 3 and 4. The contacting edges are offset with respect to each other and are reduced to insure a perfect weld and avoid the fin.

Fig. 8, shows a pair of sections L-shaped in cross section having side walls 1 and outer peripheral walls 3 only. The meeting edges of the peripheral walls are to be welded and such edges are reduced to avoid the fin.

Fig. 9, shows a pair of L-shaped sections, one of which has inner and outer peripheral walls. The meeting edges of the peripheral walls are reduced to avoid the fin. This view shows the sections before they have been welded. When the collar is finished, the bottom 5 of the cup of the inner section will lie against the bottom 6 of the cup of the outer section, and the material at this point will be cut away as indicated by the dotted lines to form the shaft engaging portion of the collar.

Fig. 10, shows a structure somewhat similar to Fig. 9; the sections being in the assembled form before welding, with the nut in place and the set screw positioned therein. In this case the side wall of the inner section abuts the peripheral walls of the outer section, and when the collar is finished the webs 5 and 6 of the cups will be cut away on the dotted lines to form the shaft engaging portion.

Fig. 11, shows a structure made of two U-shaped sections secured together by tubular members 10, disposed in the hollow space between the side walls of the sections; the latter having struck up projections 11 over which the ends of said tubular members rest. The weld will be made at these contact points and when finished the outer peripheral walls will abut on a substantially central line. Instead of the tubular members I may employ the connecting pieces 10ª, shown in Fig. 30, having the contact points or spuds 12, which may pass through apertures in the side walls and be welded thereto.

Fig. 12, shows a perspective view of a partially finished collar; Fig. 13, a sectional view of the same, and Fig. 14, a side elevation of the inner member. In this form of structure, the side wall of the inner member is corrugated to form a series of contact points for engagement with the edge of the peripheral wall of the outer member. The parts are welded together where they contact, and when such weld has been accomplished, I place the structure in a die and flatten the corrugations. Fig. 14, shows the bottom web 5 of the cup which is subsequently cut away to finish the collar; Fig. 13, showing the structure with the webs of both cups cut away but before the corrugations have been flattened.

Fig. 15, shows a structure having sections of substantially the same contour as those shown in Fig. 9. In this instance the abutting edge of the peripheral wall of the inner member is provided with scallops 13 forming contact points. When the weld is completed the bottoms 5 and 6 of the cups will abut and the material of the same will then be cut away to form the shaft engaging portion.

Fig. 16, shows a half plan view of a structure, and Fig. 17, a section of the same in which the side wall of the inner member is provided with scallops 13ª forming contact points. When the weld has been made, the projecting portion of the peripheral wall of the outer member may be turned down, by spinning or any other approved way, to hide the line of the weld, or it may be cut away, the weld closing the spaces between the contact points.

In Fig. 18, I have shown a nut assembled with the sections and covered with insulating material 14 to prevent welding of the same to the sections of the collar.

Figs. 19, 20, 21, 22, 23 and 24, show various forms of contacts and contact points within the scope of my invention. In many of them, reduced edges are provided to avoid the fin caused by welding.

In Figs. 25 and 26, I show collars with sections of substantially the same contour, having the side walls offset at 15, and secured together by an annular connecting band 16, such as shown in Fig. 27. This band is provided with contact points 17 which are welded to the side walls of the collar.

In Figs. 28 and 29, I have shown a form of collar having integral screw receiving means. These structures will be welded at suitable points in the same manner as the other sections, and the struck up portions, that indicated at 18 in Fig. 28, and those indicated at 18 and 19, in Fig. 29, will be internally threaded to receive a set screw. The structure shown in Fig. 29, has the outer peripheral wall cupped to accommodate the head of the set screw.

I may, if desired, position the nut in the shell and weld the same to one or more sections, or I may weld the nut to one section before the latter is assembled for welding to the other section. It is not necessary to weld the nut in every instance, however, and when it is not welded to said sections but arranged to be confined in place by struck up portions of the shell as in the structures shown in my applications filed August 1, 1908, Serial Numbers 446,477 and 446,478, or in my patents dated August 4, 1908, Nos. 894,884; 895,408, and 895,409, such nut will be suitably positioned in the shells and then insulated from the collar as shown in Fig. 18.

When welding the several sections together, prior to removing the webs of the cups to form the shaft engaging portion, I place suitable insulating material between such webs.

Any form of contact which will insure the securing together of one section to another may be employed, and I do not wish to be limited to any specific form. Any combination of contact points such as shown may be made with the various sections shown. For instance the thimbles 10, or the pieces 10ᵃ may be used with other forms of sections than those shown, and the contact features of any form shown may be applied with equally good results to any of the other structures.

In practice I can secure good results by securing the nut to one of the sections by a single weld at one corner of the same. If desired the nuts may be provided with special contact points, or with spuds to pass through apertures in the side walls of the collars. I may also employ half nuts, one half welded to one section and the other half welded to the other section; such halves being threaded if desired so that when the sections are brought together, the threads will register, or the half sections of such nut may be simply punched and the threads made after assembly.

Instead of welding the sections together they may be placed in dies and one portion of one section turned over against or displaced with respect to the other section. This die action may also be employed in addition to the welding operation.

The aperture in the peripheral walls of the sections for the passage of the set screws will be made before the sections are assembled and the nut will always lie in registry with such apertures when the sections are being secured together to form the finished collar. The webs 5 and 6 may be cut away before or after the sections are secured together, depending upon the manner of securing such sections.

In my claims reference is made to a "hollow annular space" as being formed when the shaped bodies of sheet metal are assembled. This term is intended to cover as well the space between the side walls and the peripheral flange 16 of the form of collar shown in Fig. 25.

I claim:

1. The process of forming shaft collars, which consists in so shaping a plurality of bodies of sheet metal that when assembled a structure is formed having a hollow annular space, butt-welding the contacting parts of said bodies to form the hollow collar, and simultaneously securing a threaded member to said collar within its hollow annular space.

2. The process of forming shaft collars, which consists in so shaping a plurality of bodies of sheet metal that when assembled a structure is formed having a hollow annular space, aperturing said bodies, butt-welding the contacting parts of said bodies to form the hollow collar, and simultaneously securing an apertured nut to said collar within its hollow annular space in line with the apertured portion of the same.

In testimony whereof, I have signed my name to this specification, in the presence of two subscribing witnesses.

HOWARD T. HALLOWELL.

Witnesses:
E. W. SATTERTHWAITE,
E. B. SATTERTHWAITE.